US006877009B2

(12) United States Patent
Solomon

(10) Patent No.: US 6,877,009 B2
(45) Date of Patent: Apr. 5, 2005

(54) SYSTEM AND METHOD FOR COMPILING AND DISPLAYING A PRUNED INFORMATION SET

(75) Inventor: Bernard J. Solomon, Seal Beach, CA (US)

(73) Assignee: UGS Corp., Plano, TX (US)

( * ) Notice: Subject to any disclaimer, the term of this patent is extended or adjusted under 35 U.S.C. 154(b) by 380 days.

(21) Appl. No.: 10/034,231

(22) Filed: Dec. 27, 2001

(65) Prior Publication Data

US 2003/0126115 A1 Jul. 3, 2003

(51) Int. Cl.[7] .............................................. G06F 17/30
(52) U.S. Cl. ........................ 707/100; 707/3; 707/101; 707/102; 345/854; 345/859
(58) Field of Search ......................... 707/1–3, 100–102, 707/104.1; 345/853–854, 859

(56) References Cited

U.S. PATENT DOCUMENTS

| 5,740,445 | A | * | 4/1998 | Okuda .......................... 707/102 |
| 5,973,695 | A | * | 10/1999 | Walsh et al. ................. 345/854 |
| 6,105,062 | A | * | 8/2000 | Andrews et al. ............. 709/223 |
| 6,128,016 | A | * | 10/2000 | Coelho et al. ............... 345/808 |
| 6,237,006 | B1 | * | 5/2001 | Weinberg et al. ........ 707/103 R |
| 6,304,790 | B1 | * | 10/2001 | Nakamura et al. ............. 700/97 |
| 6,374,253 | B1 | * | 4/2002 | Weider et al. ............... 707/102 |

OTHER PUBLICATIONS

Boykin et al, USP Application No. 2003/001894 A1, Jan. 2, 2003.*
PCT Search Report for PCT/US 02/38939, 6 pages, Feb. 3, 2004.

Desclefs et al., XP–002163254, "Navigation in Huge Information Hierarchies," pp. 1–15.

Hearst et al., XP–000782010, "Cat–a–Cone: An Interactive Interface for Specifying Searches and Viewing Retrieval Results using a Large Category Hierarchy," pp. 246–255, 1997.

Kumar et al., XP–002088976, "Browsing hierarchical data with multi–level dynamic queries and pruning," pp. 103–124, 1997.

Kaugars, XP–008012937, "OTree: A Tree Visualization using Scaling and Omission," pp. 491–496, 1999.

* cited by examiner

Primary Examiner—Greta Robinson
Assistant Examiner—Debbie M. Le
(74) Attorney, Agent, or Firm—Baker Botts L.L.P.

(57) ABSTRACT

The processing system 10 is disclosed which uses a user interface 12 to interact with the search and control engine 16 and the display engine 18. The search and control engine 16 operates on a data set 14 to identify specific elements within a directory structure. Display engine 18 compiles the identified elements in a tree table 20 to format a display 22 associated with the directory structure. Pruning indicator 34 and a sibling pruning indicator 36 are used in the display 22 to inform the user that intermediate directory structures and sibling elements have been omitted from the display in order to show the identified elements in a truncated context within the complex directory structure.

13 Claims, 2 Drawing Sheets

SYSTEM AND METHOD FOR COMPILING AND DISPLAYING A PRUNED INFORMATION SET

TECHNICAL FIELD OF THE INVENTION

This invention relates generally to the field of data processing systems and more particularly to an improved system and method for compiling and displaying a pruned information set.

BACKGROUND OF THE INVENTION

Databases of information are commonly organized as nested directories where information that is related is grouped together in a nested fashion. These nested directories can sometimes contain many levels so that an individual piece of information may be categorized by a multiplicity of levels of directory organization.

These organizational structures are commonly used in file systems in data processing environments. For example, in an engineering data management or a computer aided design (CAD) system the components of an assembly can be organized in a nested bill of materials. For example, a particular fastener may be associated with a particular bracket, which may be associated with a particular assembly on a particular portion of a larger machine. Each of these levels of abstraction may be associated with a directory level within the organized bill of materials.

Engineering data management systems, CAD systems and other file systems typically allow a user to perform searches through the data components organized in the file structure. The results of these searches can return a simple list of the components to the user. However, it is sometimes advantageous to show the user where in the data hierarchy the components reside. Unfortunately, due to the many levels of organization, the display of these results is very difficult. For example, if two components are identified by a particular search, but these components are not within the same subassembly, it is difficult to display the entire hierarchy associated with the two components because of the need to display the multiplicity of directory layers associated with each component.

SUMMARY OF THE INVENTION

Accordingly, a need has arisen for a system and method for displaying and compiling pruned directory listings that addresses problems associated with prior techniques.

In accordance with one embodiment of the present invention, a method of displaying a subset of a data set is disclosed which comprises the step of displaying a data element in the context of a subset of the data hierarchy. A pruned elements indicator is also displayed to indicate to the user that portions of the data hierarchy have been pruned.

According to another embodiment of the present invention, a pruned sibling indicator can be displayed to the user concurrently with the selected data element to indicate that the data element is associated with sibling data elements that have been pruned from the data display to the user.

An important technical advantage of the system and method of the present invention inheres in the fact that the selective pruning of data elements from the displayed data hierarchy allows for the data elements that are displayed to be shown in the context of the data hierarchy but without the clutter of the entirety of the multiplicity of levels of the data hierarchy.

BRIEF DESCRIPTION OF THE DRAWINGS

For a more complete understanding of the present invention may be acquired by referring to the accompanied figures in which like reference numbers indicate like features and wherein.

DETAILED DESCRIPTION OF THE DRAWINGS

Figure 1:
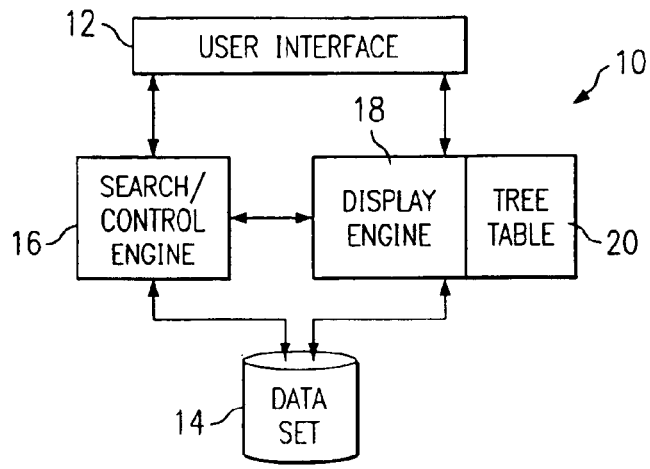
FIG. 1 is a schematic block diagram of one embodiment of a system constructed according to the teachings of the present invention.

"FIG. 1 is a schematic block diagram of a data processing system indicated generally at 10 which comprises a user interface 12. User interface 12 is operable to display data and receive commands from a user which is interfacing with system 10. User interface 12 may comprise a software application or a portion of a data processing system that may include a computer screen, computer keyboard, and a pointing device such as a mouse or a track ball. Using these systems, a graphical display can be presented to a user and the user can type in commands or terms and use the pointing device to select active portions of the screen to institute actions or select items on the screen. According to one embodiment of the present invention, system 10 may comprise a portion of a computer aided design (CAD) system or an engineering data management system. CAD systems are ordinarily associated with the design of an assembly whereas engineering data management systems are ordinarily associated with the management of design data and related parameters after design, during, for example, manufacture or testing of the assembly. Both such types of system commonly use large, hierarchically organized data sets that would benefit from the teachings, of the present invention. In these embodiments, the user interface is operable to present graphical images of components of assemblies which are designed, modeled, or managed using the system 10."

It is sometimes useful in the context of a computer aided design system to compile and store a complete list of the components of a system being designed in a bill of materials data set. This information is represented by data set 14 which is shown in FIG. 1. The user interface 12 can access the data within data set 14 using a search and control engine 16 also shown in FIG. 1. The portions of the data set to be displayed through interface 12 are controlled by a display engine 18 which stores the information to be displayed in a tree table 20.

In operation, a user interacting with user interface 12 might input a set of search terms, conditions, or commands which would be used to identify portions of the data within data set 14. For example, the user might input various descriptive terms such as "fastener", "aluminum", and "less than 2 inches in length." The search and control engine 16 may then apply the search terms and parameters to the data stored within data set 14 and identify a subset of the data set 14 that is responsive to the search limitations.

The display engine 18 may then identify the portions of the data set 14 within the data hierarchy that are associated with the identified elements and organize the results in an organized directory tree as represented by tree table 20.

According to the teachings of the present invention, the resulting display presented to the user through user interface 12 may comprise a "pruned" bill of materials display. In contrast, in order to compile and present conventional displays of a bill of materials, conventional CAD systems and engineering data management systems typically will identify the elements within the data structure which are identified by the search in the context of the complete remaining directory tree. This can result in a very confusing display because the identified elements may be located extremely deep in the directory structure. As such, the illustration of where these elements lie in the directory tree can take up a great deal of space on the display and make it difficult to display more than one or two identified elements. It should be understood that the term "directory" is used herein in its broadest possible sense to mean any grouping of information. In some systems and data sets, these groupings may be referenced to as assemblies, subassemblies, directories, subdirectories, file groups, file sections, folders, subfolders or any other of a number of terms used to identify groups of information.

Figure 2:
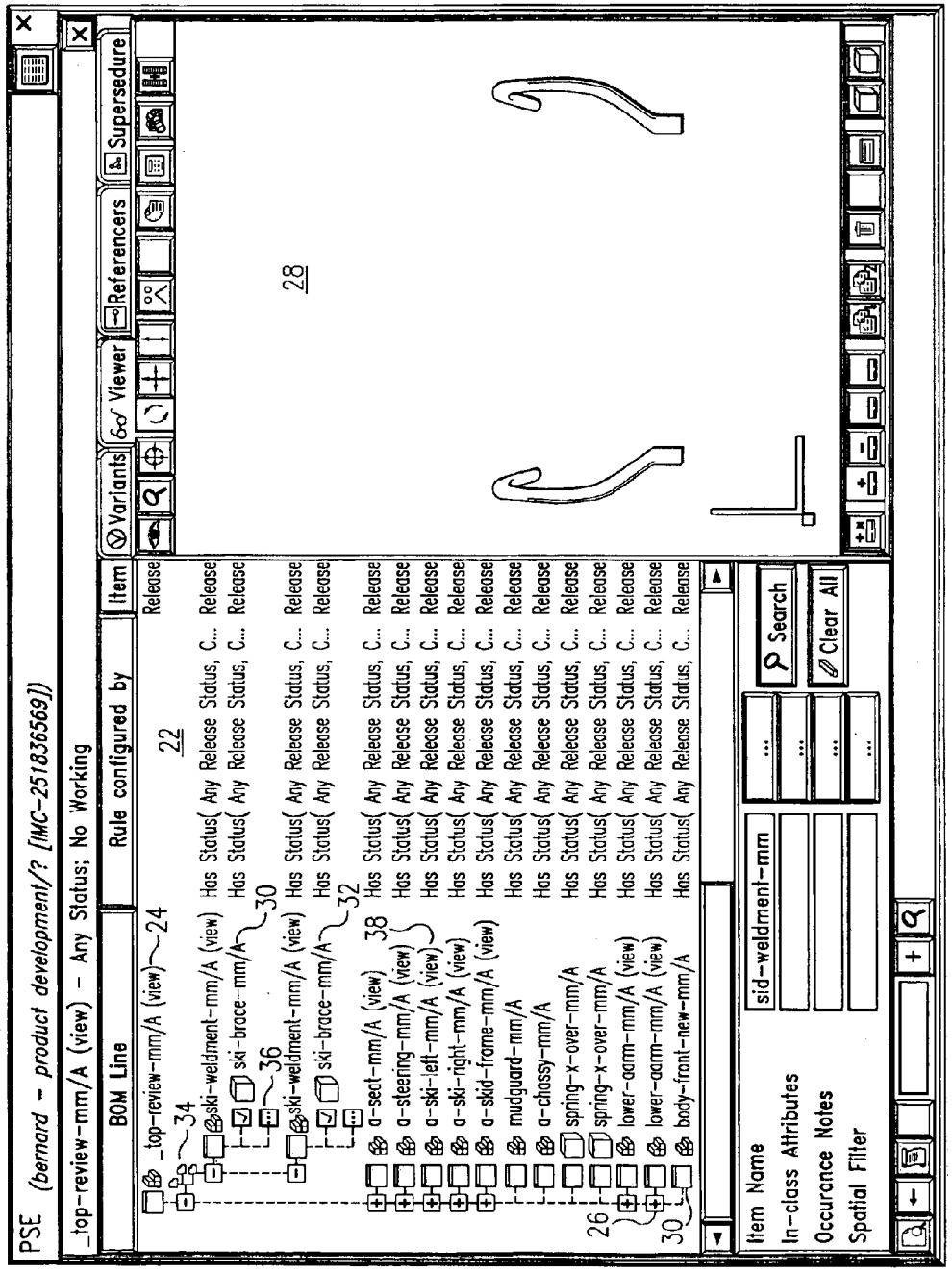
FIG. 2 is a diagram of one embodiment of a user interface that may be used in conjunction with the teachings of the present invention.

FIG. 2 illustrates a pruned bill of materials display indicated generally at 22 which may be used in conjunction with the method and system of the present invention. Display 22 shows a directory structure associated with a bill of materials for an exemplary snow mobile. The highest level of organization shown in display 22 is the directory or assembly titled "top review" indicated at 24 in FIG. 2. The next level within the bill of materials includes directories for the seat, steering, left and right skis, a skid frame, mud guard, chassis, several springs, lower arms, and the front body of the snowmobile. As is common in directory structures, if a level of a directory has further elements within it that are not being displayed, an expansion indicator such as indicator 26, is placed to the left of the associated directory. By selecting and clicking on the expansion indicator 26 the subdirectories within the higher level directory can be displayed. The display 22 shown in FIG. 2 also includes the capability to display images of the components of the system associated with the bill of materials in a component display window 28. If the user desires to see images of the components, the user can place a check in an element display box, such as element display box 30 indicated in FIG. 2.

Display 22 shown in FIG. 2 illustrates the display presented according to the teachings of the present invention if the user has asked the system to present all "brace" elements within the bill of materials. As shown in display 22, the system has identified a ski brace indicated at 30 and a ski brace indicated at 32 which are responsive to the requested search. Ski brace 30 is shown to be a component of a directory titled "Ski Weldment." Ski brace 32 is also shown to be a component of another directory titled "Ski Weldment." The identified components, ski brace 30 and ski brace 32, are, therefore, shown within their immediate parent directory so that the user can see the immediate context of the identified elements. However, all the interceding directories between the parent directory "top review" and the directory "Ski Weldment" are omitted from the display and replaced by a pruning indicator 34. Pruning indicator 34 indicates to the user that intermediate directories, between the "top review" directory and the "Ski Weldment" directory, have been omitted from the display for purposes of clarity.

In order to further simplify the display in order to highlight the identified elements, the identified element ski brace 30 is shown as the only displayed element of the parent directory "Ski Weldment." All other components within "Ski Weldment" are omitted and replaced by a sibling pruning indicator 36 shown in FIG. 2. Sibling pruning indicator 36 indicates to the user that other elements exist within the "Ski Weldment" directory that are not illustrated in the display 22. These elements are omitted for purposes of clarity so that more of the identified elements may be shown in the single display 22.

The identified elements, ski brace 30 and ski brace 32, are shown in display 22 within the context of their immediate parent directory. However, these elements are actually stored within the tree table 20 within a directory that is a direct child of the "top review" directory which is also illustrated in display 22. For example, ski brace 30 may be a component of the left ski directory indicated at 38 in FIG. 2 or a component of a subdirectory within the left ski directory. Accordingly, if a user clicks on the expansion indicator associated with the left ski directory 38 and continues to expand the subdirectories until the user reaches the Ski Weldment subdirectory associated with ski brace 30, the system illustrated will reformat the display so that the ski brace 30 is shown within the appropriate left ski directory 38 or appropriate subdirectory. In this manner, if a user desires to see the complete expanded directory structure associated with an identified element and configures the display using the expansion indictors to locate that subdirectory, the display will move the identified element into the appropriate subdirectory so that the user can see the expanded subdirectory relationships. In the identified example, if the user expanded all the directories underneath the left ski directory 38, the Ski Weldment directory and ski brace element 30 would be removed from the top of the display 22 and placed in the appropriate place within the expanded left ski directory 38.

Figure 3:
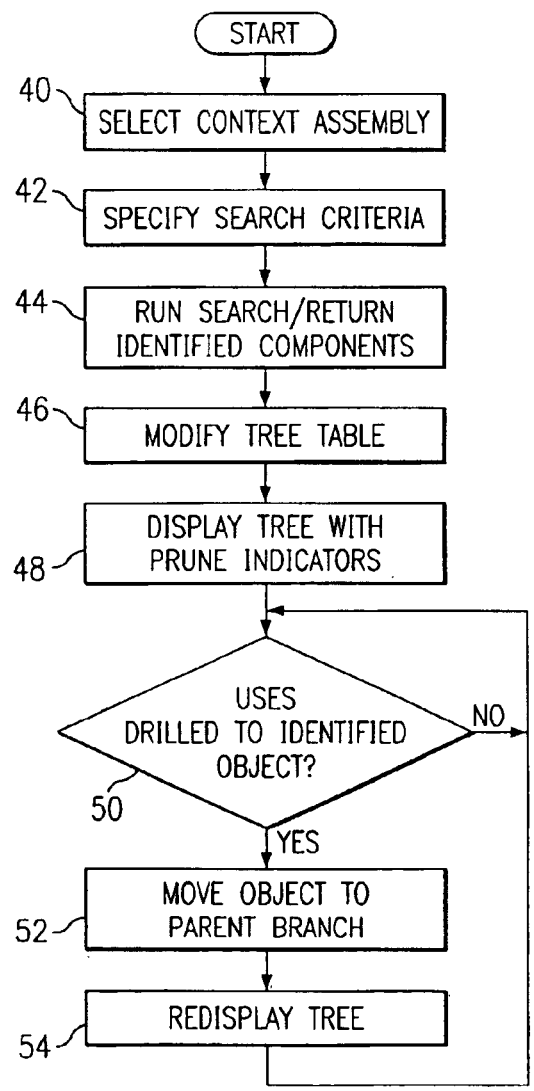
FIG. 3 is a flow diagram illustrating a user interface method which may be used in conjunction with the teachings of the present invention.

FIG. 3 is a flow diagram which illustrates one embodiment of a method of operation of a system constructed according to the teachings of the present invention. The method begins at step 40 where a user will select a context assembly. For example, in the exemplary bill of materials in FIG. 2, the user has selected the "top review" context assembly for the snowmobile. The method then proceeds to step 42 where the user specifies the search criteria to identify specific elements within the selected assembly. Elements can be searched by product name or by the characteristics of a product. In addition, searches can be performed by identifying all elements within a particular relationship to a specific identified element. For example, a search could be performed for all elements within the bill of materials that are within five inches in the assembled system from a particular identified element.

The method then proceeds to step 44 where the identified search is performed by the search and control engine 16 by applying the search terms and search criteria to the data set 14. The search and control engine 16 then assembles the identified components and communicates the resulting list of identified components to the display engine 18. The method then proceeds to step 46 where the display engine 18 modifies the tree table 20 so that the identified components and their immediate parent directories are placed at the top of the tree table 20 as was discussed with reference to display 22 in FIG. 2. The method then proceeds to step 48 where the display engine 18, through the user interface 12, displays the resulting directory tree, including the associated prune indicators and sibling prune indicators such as prune indicator 34 and sibling prune indicator 36 discussed with reference to FIG. 2. The method then enters a loop associated with a decision block 50 where the display engine 18 in user interface 12 determines whether or not the user has expanded directory structures within the display to a level associated with an identified object. The method continues to test for this condition until the user opens a directory associated with an identified object at which point the method proceeds to step 52 where the display engine 18 once again modifies the tree table 20 to move the identified object to the correct parent directory structure. The method then proceeds to step 54 where the modified tree table 20 is used to construct a modified display with the identified element moved to the correct parent directory structure and with the pruning indicators associated with the identified element removed. The method then returns to the conditional block 50 to wait for further interaction with the user.

Although the present invention has been described in the context of an exemplary computer aided design system, the scope of the present invention should not be limited to this or any exemplary embodiment. For example, the teachings of the present invention are equally applicable to other directory structures that are faced with the challenge of presenting to a user identified elements within the directory structure that are difficult to present in context because of the multiplicity of identified elements or the depth of the directory structure or both. For example, a search of specific data elements or files within a file system organized through a hierarchical directory could receive substantial benefit from the techniques described herein through the use of pruning indicators or sibling pruning indicators to simplify the display of the identified elements in a truncated context.

Although the present invention has been described in detail, it should be understood that various changes, alterations, substitutions and modifications may be made to the teachings described herein without departing from the spirit or scope of the present invention which is solely defined by the appending claims. To aid patent examining authorities and any readers of any patent issued on this application in interpreting the scope of the claims appended hereto, applicants wish to note that they (a) do not intend any of the appended claims to invoke paragraph 6 of 36 U.S.C. § 112 as it exists on the date of filing hereof, unless the terms "means for" or "step for" are used in any particular claim; (b) do no intend any of the terms used in the claims to have a special meaning, but instead should all be construed to have their ordinary meaning to one of ordinary skill in the art, and (c) do not intend by any statement in the specification to limit the invention in any way that is not otherwise reflected in the claims.

What is claimed is:

1. A method for processing data elements stored in a data set, comprising:

organizing the data elements in a directory structure including identifying particular elements with particular directories;

identifying particular elements within the data set in response to search criteria; and formatting a tree table associated with the data set and associated with a display where information associated with the identified data elements is displayed in the context of information associated with an immediate parent directory of the identified data elements and where a pruning indicator display element is included as a portion of the display to indicate to a user that at least one directory structure associated with the immediate parent directory exists within the directory structure but has been omitted from the display.

2. The method of claim 1 whereby the display further comprises a sibling pruning indicator display element which is included in the display to indicate to a user of the display that data elements which are siblings of an identified data element within the immediate parent directory exist within the data set but have been omitted from the display and replaced by the sibling pruning indicator display element.

3. The method of claim 1 and further comprising:

receiving inputs from a user of the display indicating the user's desire to view particular subdirectory structures within the directory structure associated with the data set;

identifying a subdirectory to be displayed in response to input received by the user that includes an identified data element that is displayed in conjunction with a pruning indicator display element; and reformatting the display to move the identified data element into the expanded subdirectory display group without the pruning indicator display element such that the identified data element is shown in the correct directory context associated with the directory structure associated with the data set.

4. The method of claim 1 wherein the display system comprises a component of a computer aided design system and wherein the data elements are digital data sets associated with physical components of a system having a graphical representation associated with the computer aided design system.

5. The method of claim 1 wherein the display system is associated with a file storage system and wherein the data elements are data files organized in a hierarchical directory structure.

6. A data processing system, comprising:

a user interface operable to receive commands from a user and display information to the user;

a display engine in communication with the user interface and operable to organize a data set into a tree table so that the data set can be displayed as a hierarchical directory tree with data elements organized in subdirectories within the tree;

a search and control engine in communication with the user interface and operable to perform searches on the data set to identify particular data elements responsive to information received from the user via the user interface; and the display engine operable to format the tree table such that the particular identified data elements are displayed through the user interface with a respective parent subdirectory to which each particular identified data element is a member and such that a pruning indicator display element is displayed associated with each particular identified data element which is displayed in a fashion that omits at least one parent directory associated with the particular element.

7. The system of claim 6 wherein the user interface is operable to receive commands from the user to display at least one hidden subdirectory and wherein the display engine is operable to reformat the tree table to remove the pruning indicator display element if a user commands the display of the parent directory associated with a particular identified data element and to display the particular identified data element in the expanded data tree, including any exposed hidden directories.

8. The system of claim 6 wherein the display engine is operable to substitute a sibling pruning indicator display element for data elements which are siblings of the particular identified data element within the parent subdirectory.

9. The system of claim 6 wherein the data set comprises data files within a hierarchically organized file system.

10. The system of claim 6 wherein the data set comprises data elements comprising digital data sets representative of structural components of an assembly renderable by a computer aided design system.

11. A method for processing data elements stored in a data set, comprising:

organizing the data elements in a directory structure including identifying particular elements with particular directories;

identifying particular elements within the data set in response to search criteria;

formatting a tree table associated with the data set and associated with a display where information associated with the identified data elements is displayed in the context of information associated with an immediate parent directory of the identified data elements and where a pruning indicator display element is included as a portion of the display to indicate to a user that at least one directory structure associated with the immediate parent directory exists within the directory structure but has been omitted from the display;

displaying a sibling pruning indicator display element in the display to indicate to a user of the display that data elements which are siblings of an identified data element within the immediate parent directory exist within the data set but have been omitted from the display and replaced by the sibling pruning indicator display element;

receiving inputs from a user of the display indicating the user's desire to view particular subdirectory structures within the directory structure associated with the data set;

identifying a subdirectory to be displayed in response to input received by the user that includes an identified data element that is displayed in conjunction with a pruning indicator display element; and reformatting the display to move the identified data element into the expanded subdirectory display group without the pruning indicator display element such that the identified data element is shown in the correct directory context associated with the directory structure associated with the data set.

12. The method of claim 11 wherein the display system comprises a component of a computer aided design system and wherein the data elements are digital data sets associated with physical components of a system having a graphical representation associated with the computer aided design system.

13. The method of claim 11 wherein the display system is associated with a file storage system and wherein the data elements are data files organized in a hierarchical directory structure.

* * * * *